US012785006B2

(12) United States Patent
Hwang et al.

(10) Patent No.: US 12,785,006 B2
(45) Date of Patent: Nov. 3, 2026

(54) KEY INPUT DEVICE INCLUDING ELASTIC MEMBER AND ELECTRONIC DEVICE INCLUDING THE SAME

(71) Applicant: Samsung Electronics Co., Ltd., Suwon-si (KR)

(72) Inventors: Seongyu Hwang, Suwon-si (KR); Choongyoun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 18/325,657

(22) Filed: May 30, 2023

(65) Prior Publication Data

US 2023/0298832 A1 Sep. 21, 2023

Related U.S. Application Data

(63) Continuation of application No. PCT/KR2022/014163, filed on Sep. 22, 2022.

(30) Foreign Application Priority Data

Sep. 30, 2021 (KR) ........................ 10-2021-0130163

(51) Int. Cl.

*H01H 13/14* (2006.01)
*G06F 1/16* (2006.01)

(Continued)

(52) U.S. Cl.

CPC ........... *H01H 13/14* (2013.01); *G06F 1/1662* (2013.01); *G06F 3/0202* (2013.01); *H01H 13/7006* (2013.01); *H01H 2221/044* (2013.01)

(58) Field of Classification Search

CPC .... H01H 13/14; H01H 13/48; H01H 13/7006; H01H 13/705; H01H 2221/044;

(Continued)

(56) References Cited

U.S. PATENT DOCUMENTS

| | | | |
|---|---|---|---|
| 6,700,508 B1 | 3/2004 | Nomura et al. | |
| 8,643,603 B2 | 2/2014 | Lee | |
| 8,777,115 B2 * | 7/2014 | Ledevehat | H01H 13/14 235/487 |

(Continued)

FOREIGN PATENT DOCUMENTS

| | | |
|---|---|---|
| CN | 205881769 U | 1/2017 |
| JP | 2001-143568 A | 5/2001 |

(Continued)

OTHER PUBLICATIONS

International Search Report dated Dec. 29, 2022, issued in International Application No. PCT/KR2022/014163.

(Continued)

*Primary Examiner* — Kyung S Lee
(74) *Attorney, Agent, or Firm* — Jefferson IP Law, LLP

(57) ABSTRACT

An electronic device is provided. The electronic device includes a housing having a first surface, a second surface formed parallel to the first surface, and a side surface surrounding a space formed between the first surface and the second surface and a key input device disposed on the first surface and including a plurality of keys. Each of the plurality of keys includes a support member including a conductive contact member, a switch member disposed on one surface of the support member and electrically connected to the conductive contact member of the support member, a key cap, and an elastic member having one surface on which the key cap is disposed, and other surface on which the switch member is disposed at least in part. The elastic member includes a pressing member and at least one elastic bridge connecting the pressing member and a guide region.

18 Claims, 11 Drawing Sheets

(51) Int. Cl.
*G06F 3/02* (2006.01)
*H01H 13/70* (2006.01)

(58) Field of Classification Search
CPC ....... H01H 2215/036; H01H 2235/006; H01H 2235/018; G06F 1/1662
See application file for complete search history.

(56) References Cited

U.S. PATENT DOCUMENTS

| | | | | |
|---|---|---|---|---|
| 8,957,333 | B2 * | 2/2015 | Chou | H01H 13/705 200/5 A |
| 2006/0260923 | A1 | 11/2006 | Lee et al. | |
| 2014/0014730 | A1 | 1/2014 | Ledevehat | |
| 2014/0299456 | A1 | 10/2014 | Chou | |
| 2015/0014140 | A1 | 1/2015 | Liu | |
| 2015/0348726 | A1 | 12/2015 | Hendren | |
| 2015/0363006 | A1 | 12/2015 | Hsu | |
| 2019/0354197 | A1 | 11/2019 | Chen et al. | |
| 2020/0185166 | A1 | 6/2020 | Doro et al. | |

FOREIGN PATENT DOCUMENTS

| | | | |
|---|---|---|---|
| JP | 2003-330595 | A | 11/2003 |
| JP | 2021-082377 | A | 5/2021 |
| KR | 10-0363460 | B1 | 11/2002 |
| KR | 10-2009-0126078 | A | 12/2009 |
| KR | 20-2011-0005057 | U | 5/2011 |
| KR | 10-1548738 | B1 | 9/2015 |
| KR | 10-2016-0088231 | A | 7/2016 |
| KR | 10-2018-0079857 | A | 7/2018 |

OTHER PUBLICATIONS

European Search Report dated Sep. 30, 2024, issued in European Application No. 22876750.5.
European Office Action dated Jul. 17, 2025, issued in European Application No. 22 876 750.5.
Korean Office Action dated Feb. 19, 2026, issued in Korean Application No. 10-2021-0130163.

* cited by examiner

KEY INPUT DEVICE INCLUDING ELASTIC MEMBER AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/014163, filed on Sep. 22, 2022, which is based on and claims the benefit of a Korean patent application number 10-2021-0130163, filed on Sep. 30, 2021, in the Korean Intellectual Property Office, the disclosure of which is incorporated by reference herein in its entirety.

BACKGROUND

1. Field

The disclosure relates to a key input device including an elastic member and an electronic device including the same.

2. Description of Related Art

A key input device used in a portable electronic device includes a rubber dome switch type keyboard and a membrane metal dome switch type keyboard. The rubber dome switch type keyboard has a rubber dome disposed on one surface of a key cap. Upon a key input, a user of the rubber dome switch type keyboard can sense the tactile sense of a rubber dome material. The membrane metal dome switch type keyboard is formed in a membrane structure and thus has a thin thickness. Upon a key input, a user of the membrane metal dome switch type keyboard can sense the tactile sense of a dome switch material.

The above information is presented as background information only to assist with an understanding of the disclosure. No determination has been made, and no assertion is made, as to whether any of the above might be applicable as prior art with regard to the disclosure.

SUMMARY

The rubber dome switch type keyboard realizes through the rubber dome the tactile sense sensed by the user upon a key input, so there is a problem in that it is difficult to form a thin keyboard due to the thickness of the rubber dome. The membrane metal dome switch type keyboard is formed in a membrane structure and thus has a thin thickness, but there is a problem in that, upon completion of a user's key input, the high-speed restoration of a key input part occurs due to the strong elasticity of the dome switch.

Aspects of the disclosure are to address at least the above-mentioned problems and/or disadvantages and to provide at least the advantages described below. Accordingly, an aspect of the disclosure is to provide a key input device including an elastic member and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing having a first surface, a second surface formed parallel to the first surface, and a side surface surrounding a space formed between the first surface and the second surface, and a key input device disposed on the first surface and including a plurality of keys, wherein each of the plurality of keys includes a support member including a conductive contact member, a switch member disposed on one surface of the support member and electrically connected to the conductive contact member of the support member, a key cap including a button region, and an elastic member having one surface on which the key cap is disposed, and other surface on which the switch member is disposed at least in part, and wherein the elastic member includes a pressing member capable of transmitting a force in contact with the switch member, and at least one elastic bridge connecting the pressing member and a guide region formed in a perimeter of the elastic member.

In accordance with another aspect of the disclosure, a key input device is provided. The key input device includes a plurality of keys, wherein each of the plurality of keys includes a support member including a conductive contact member, a switch member disposed on one surface of the support member and electrically connected to the conductive contact member of the support member, a key cap including a button region, and an elastic member having one surface on which the key cap is disposed, and other surface on which the switch member is disposed at least in part, and wherein the elastic member includes a pressing member capable of transmitting a force in contact with the switch member, and at least one elastic bridge connecting the pressing member and a guide region formed in a perimeter of the elastic member.

According to various embodiments of the disclosure, a key input device including an elastic member, and an electronic device including the same, may be formed to have a thin thickness using a stack structure of a membrane type keyboard.

According to various embodiments of the disclosure, a key input device and an electronic device including the same may control strong elasticity of a dome switch through an elastic member and thereby prevent high-speed restoration of the key input device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
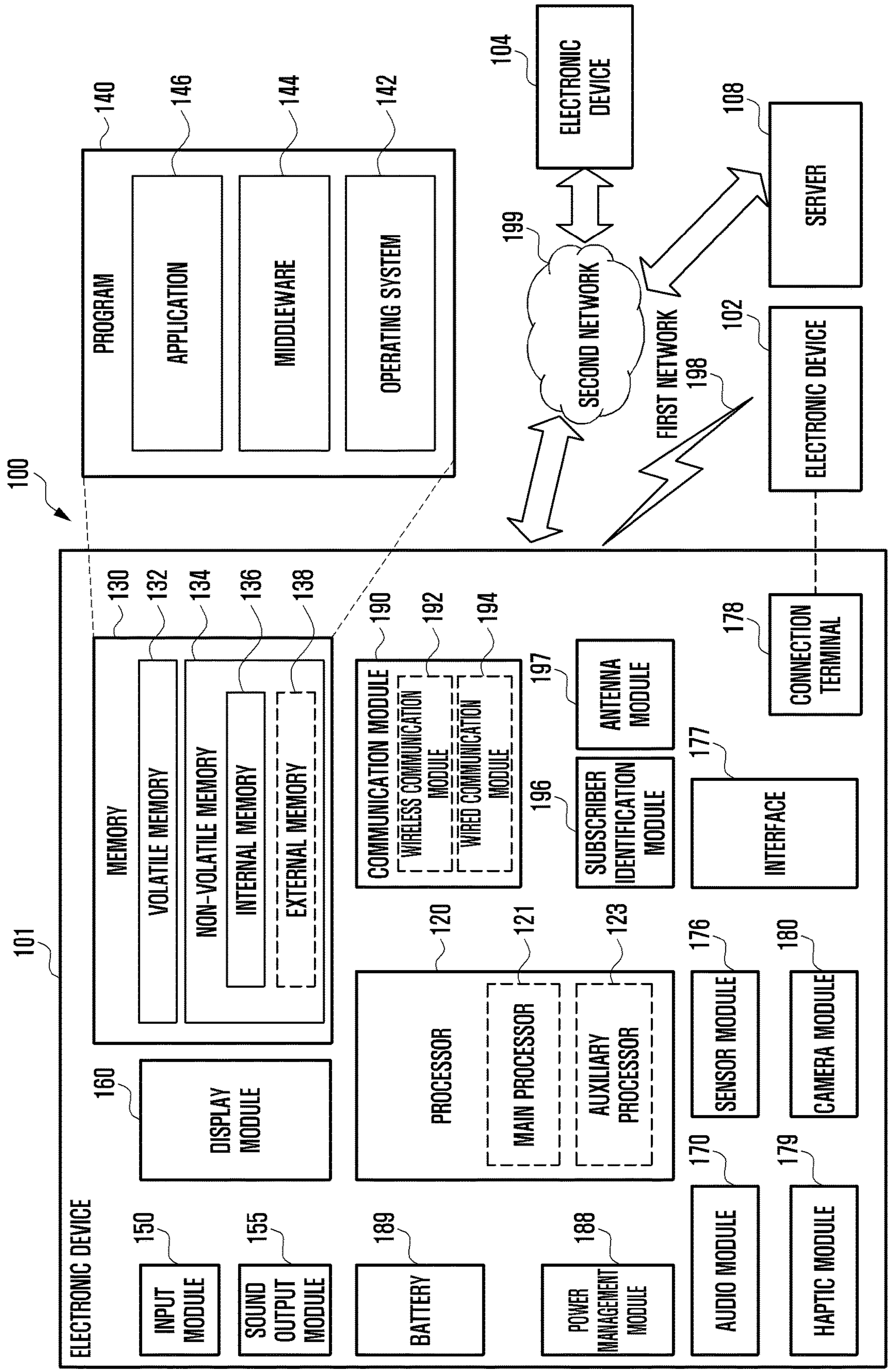
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a millimeter wave (mmWave) antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
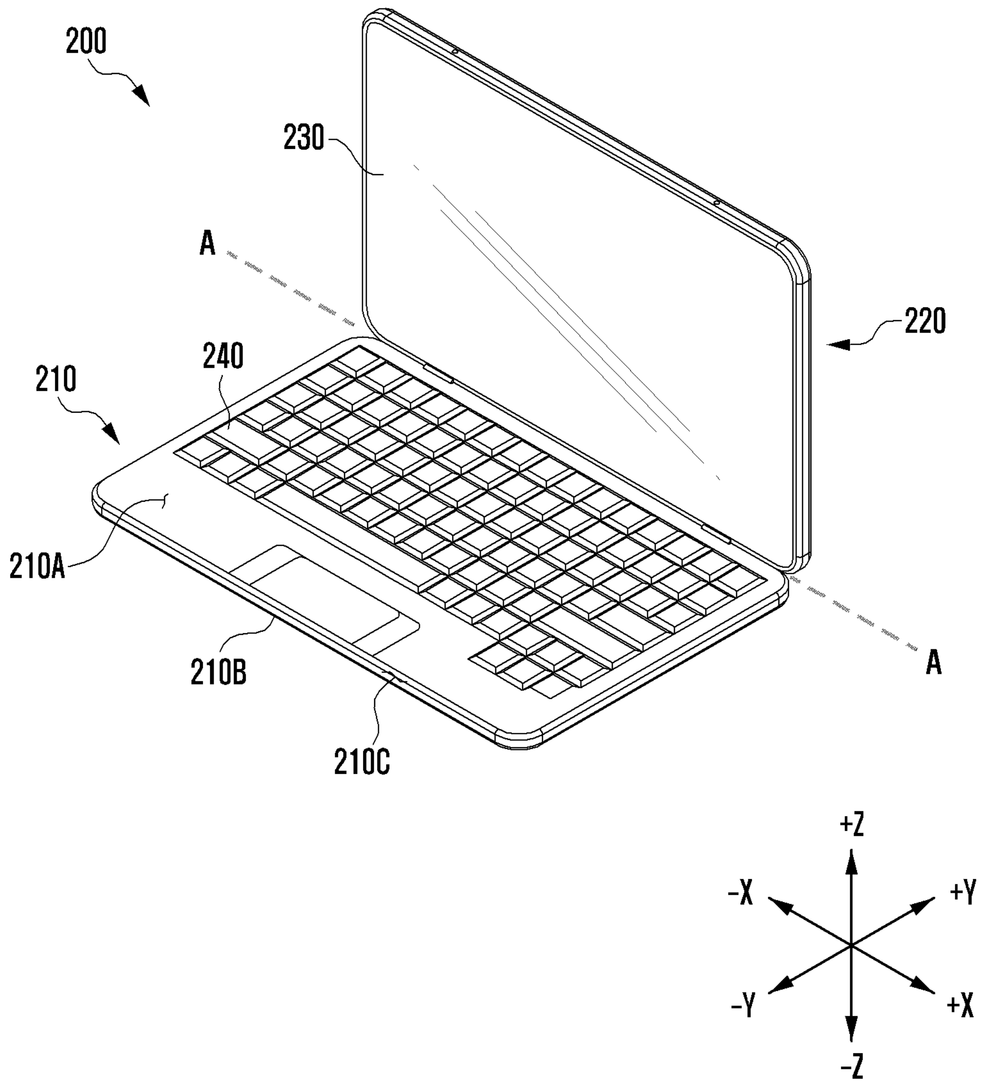
FIG. 2 is a perspective view of an electronic device according to an embodiment of the disclosure.

FIG. 2 is a perspective view of an electronic device 200 according to an embodiment of the disclosure.

According to various embodiments of the disclosure, the electronic device 101 (refer to FIG. 1) may include the electronic device 200 in the form of a notebook personal computer (PC) as shown in FIG. 2. The electronic device 200 may include a first housing 210 and a second housing 220 that can be folded to face each other. For example, based on a folding axis (e.g., the axis A-A shown in FIG. 2) of the electronic device 200, the first housing 210 and the second housing 220 can be folded to face each other. In some embodiments, the electronic device 200 can be folded such that a keyboard 240 disposed in the first housing 210 and a display module 230 (e.g., the display module 160 in FIG. 1) disposed in the second housing 220 face each other.

In an embodiment, the first housing 210 and the second housing 220 are disposed on both sides about the folding axis (e.g., the axis A-A shown in FIG. 2) of the electronic device 200, and may have an overall symmetrical shape with respect to the folding axis. In another embodiment, the first housing 210 and the second housing 220 may have an asymmetric shape with respect to the folding axis of the electronic device 200. Depending on whether the electronic device 200 is in an unfolded state, a folded state, or an intermediate state, an angle or distance between the first housing 210 and the second housing 220 may vary.

Referring to FIG. 2, the first housing 210 according to an embodiment may have a first surface 210A, a second surface 210B, and a side surface 210C surrounding a space between the first surface 210A and the second surface 210B. The first and second surfaces 210A and 210B of the first housing 210 may be parallel to each other.

In an embodiment, the side surface 210C of the first housing 210 may be manufactured separately from the first surface 210A of the first housing 210 and the second surface 210B of the first housing 210, and may be combined with at least one of the first and second surfaces 210A and 210B of the first housing 210. For example, segmented portions of the first surface 210A, the second surface 210B, and the side surface 210C of the first housing 210 may be combined in various ways (e.g., bonding through an adhesive, bonding through welding, bolted connection). In an embodiment, the side surface 210C of the first housing 210 may be integrally formed with the first surface 210A or the second surface 210B of the first housing 210. The second housing 220 may have the same constitution as the first housing 210.

According to various embodiments, various connector ports (not shown) may be formed on the side surface 210C of the first housing 210. The connector port may include a connector port (e.g., a USB connector port) for transmitting and receiving power and/or data to and from an external electronic device. In some embodiments, the connector port may also perform a function for transmitting and receiving an audio signal to and from an external electronic device, or may further include a separate connector port (e.g., an ear jack hole) for performing a function of audio signal transmission/reception.

The electronic device 200 according to various embodiments of the disclosure may include the keyboard 240. The keyboard 240 may be disposed on the first surface 210A of the first housing 210. The keyboard 240 may include a plurality of keys 300 (refer to FIG. 3).

In various embodiments, the first housing 210 and the second housing 220 may be formed of various materials, for example, a metal material and/or a non-metal material. The metal material may include an alloy such as aluminum, stainless steel (STS, SUS), iron, magnesium, or titanium, and the non-metal material may include a synthetic resin, ceramic, or engineering plastic.

In various embodiments, the first housing 210 and the second housing 220 may be manufactured in various ways. For example, it may be formed by a method such as injection or die casting.

The above-described shapes, materials, and forming methods of the first and second housings 210 and 220 shown in FIG. 2 are merely examples, and may be variously modified within a range that can be implemented by those skilled in the art.

The electronic device 101 (refer to FIG. 1) according to various embodiments of the disclosure may include the electronic device 200 in the form of a notebook PC as illustrated in FIG. 2, but is not limited thereto. For example, the electronic device 101 (refer to FIG. 1) according to various embodiments of the disclosure may include an electronic device (not shown) in the form of a tablet PC that can be connected to the keyboard 240.

Figure 3:
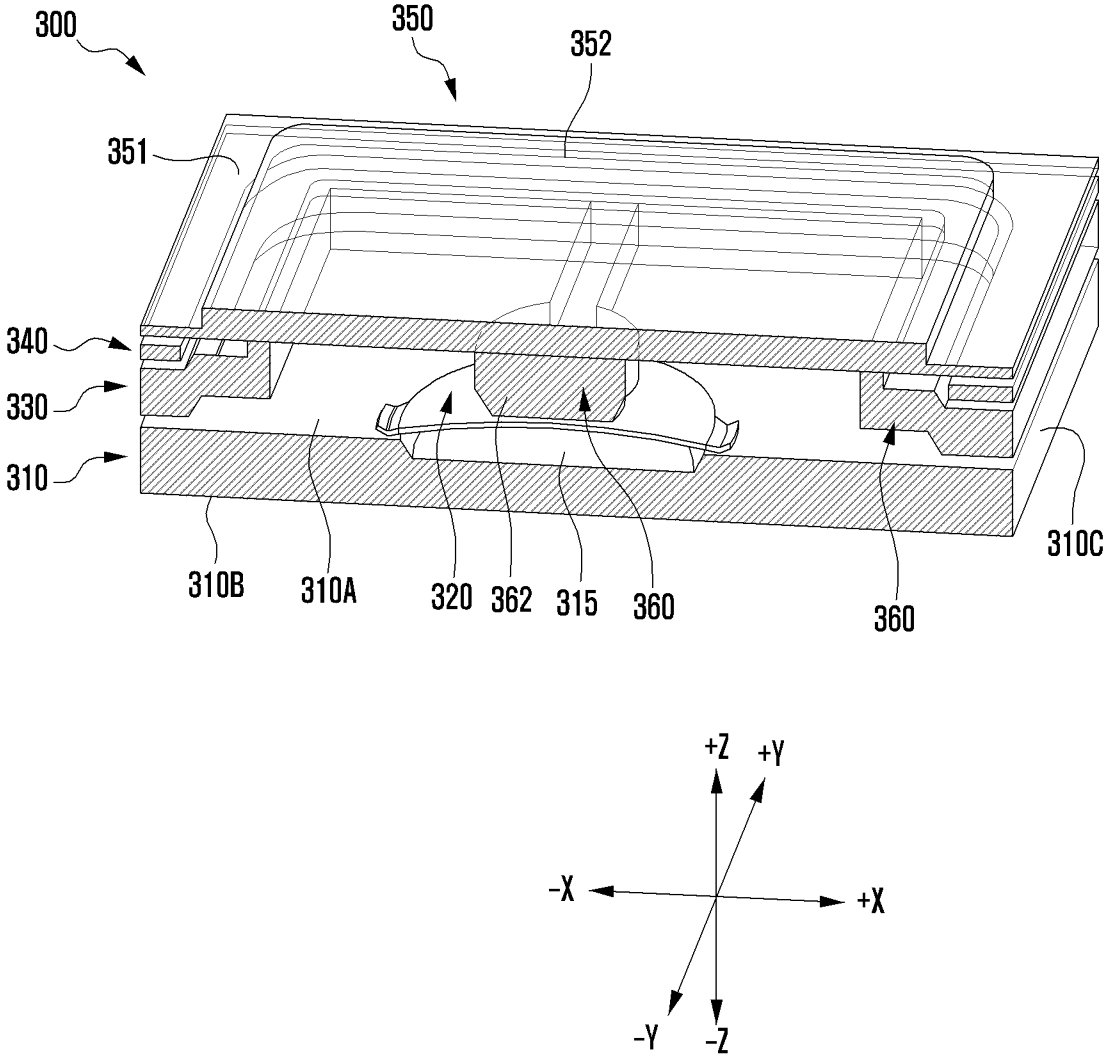
FIG. 3 is a diagram illustrating a key according to an embodiment of the disclosure.

FIG. 3 is a diagram illustrating a key 300 according to an embodiment of the disclosure.

A key input device (e.g., the keyboard 240 in FIG. 2) according to various embodiments of the disclosure may be disposed on the first surface 210A (see FIG. 2) of the housing (e.g., the first housing 210 in FIG. 2). The key input device (e.g., the keyboard 240 in FIG. 2) may include a plurality of keys 300.

Each of the plurality of keys 300 according to various embodiments of the disclosure may include a support member 310, a switch member 320, a guide pad 330, an adhesive member 340, a key cap 350, and/or an elastic member 360.

The support member 310 according to various embodiments of the disclosure may include a conductive contact member (not shown). The conductive contact member (not shown) may come into contact with and thus be electrically connected to the switch member 320. For example, in case that the user applies a force to the key 300, the elastic member 360 may transmit the force to the switch member 320, and the switch member 320 may come into contact with and be electrically connected to the conductive contact member (not shown) included in the support member 310.

According to various embodiments, the support member 310 may be configured in the form of a membrane having a thickness in the z-axis direction. For example, with reference to FIG. 3, the support member 310 may be configured in a rectangular parallelepiped shape having a thickness in the z-axis direction, and but it is not limited to the above and may have various shapes.

In various embodiments, the support member 310 may have one surface 310A facing the positive z-axis direction and the other surface 310B facing the negative z-axis direction. The support member 310 may have a side surface 310C formed between the one surface and the other surface.

According to various embodiments, the support member 310 may serve to support the switch member 320, the guide pad 330, the adhesive member 340, the key cap 350, and the elastic member 360. For example, the support member 310 may support respective components (the switch member 320, the guide pad 330, the adhesive member 340, the key cap 350, and the elastic member 360) and receive force from each of the components.

According to various embodiments, the switch member 320 may be disposed on the one surface 310A of the support member 310. For example, the switch member 320 may be positioned in the positive z-axis direction of the one surface 310A of the support member 310.

According to various embodiments, the one surface 310A of the support member 310 may have a central region 315. The central region 315 may refer to a region located at the center of the one surface 310A of the support member 310 in the longitudinal direction (x-axis direction) and the width direction (y-axis direction). The central region 315 of the support member 310 may include the conductive contact member (not shown).

Referring to FIG. 3, the central region 315 of the support member 310 according to various embodiments of the disclosure may be formed to be concave in the z-axis direction compared to other regions of the support member 310.

According to various embodiments, the switch member 320 may be disposed at a position that may overlap with the central region 315 of the support member 310. For example, the switch member 320 may be disposed in the positive z-axis direction with respect to the central region 315 of the support member 310.

According to various embodiments, in a state where no force is applied to the key 300, at least a portion of the switch member 320 may be spaced apart from the central region 315 of the support member 310. In case that a force is applied to the key 300, the switch member 320 may be deformed in the negative z-axis direction and thus come into contact with the central region 315 of the support member 310.

According to various embodiments, the elastic member 360 may be disposed in the positive z-axis direction with respect to the support member 310 and the switch member 320.

In case that the user of the key 300 applies a force to the key cap 350, the elastic member 360 according to various embodiments of the disclosure may transmit the force received from the key cap 350 to the switch member 320.

The switch member 320 according to various embodiments of the disclosure may include an elastic material. After the completion of an input by the user of the key 300, the switch member 320 may be rapidly restored due to the elasticity of the elastic material included in the switch member 320.

The elastic member 360 according to various embodiments of the disclosure may delay the rapid restoration of the switch member 320 in case that an input by the user of the key 300 is completed.

The elastic member 360 according to various embodiments of the disclosure may be made of a material including at least one of acrylonitrile-butadiene-styrene (ABS) resin, polycarbonate (PC) resin, and polypropylene (PP) resin.

The ABS resin may be composed of three components: acrylonitrile, butadiene, and styrene. The ABS resin is a thermoplastic resin, has excellent impact resistance and rigidity, and has excellent dimensional stability and molding processability. The PC resin is a thermoplastic resin and has excellent flexibility and processability. The PC resin is transparent, has excellent mechanical properties, and can impart impact resistance, heat resistance and flame retardancy to materials containing the PC resin. The PP resin is a thermoplastic resin and has excellent characteristics in light weight, mechanical properties, chemical resistance, and moldability.

In case that the same load is applied to the key 300 in the negative z-axis direction, the displacement of the elastic member 360 in the negative z-axis direction may vary depending on the material of the elastic member 360. For example, when the same load is applied to the key 300, the displacement of the elastic member 360 made of the ABS resin may be greater than the displacement of the elastic member 360 made of the PC resin. When the same load is applied to the key 300, the displacement of the elastic member 360 made of the PP resin may be greater than the displacement of the elastic member 360 made of the ABS resin.

According to various embodiments, in case that the same load is applied to the key 300, the displacement formed in the elastic member 360 may be in inverse proportion to the strength of the elastic member 360. For example, in case that the elastic member 360 is made of a material having relatively high strength, the displacement of the elastic member 360 may be formed to be relatively small.

According to various embodiments, the guide pad 330 may be disposed outside the perimeter of the elastic member 360. The guide pad 330 may be disposed around the elastic member 360 to surround the elastic member 360 and fix the relative position of the elastic member 360 inside the key 300. The guide pad 330 may be combined with the adhesive member 340 on one surface of the guide pad 330 and may be in contact with the support member 310 on the other surface of the guide pad 330.

The guide pad 330 according to various embodiments of the disclosure may be disposed on the one surface 310A of the support member 310. The guide pad 330 may be disposed along the perimeter of the support member 310 on the one surface 310A of the support member 310.

In various embodiments, one surface of the elastic member 360 may refer to an upper surface (a surface facing in the positive z-axis direction) of the elastic member 360, and the other surface of the elastic member 360 may refer to a lower surface (a surface facing in the negative z-axis direction) of the elastic member 360. The key cap 350 may be disposed on the one surface of the elastic member 360 (e.g., the upper surface of the elastic member 360). The switch member 320 may be disposed on at least a portion of the other surface of the elastic member 360 (e.g., the lower surface of the elastic member 360).

According to various embodiments, the elastic member 360 may be positioned to be spaced apart from the one surface 310A of the support member 310. For example, with reference to FIG. 3, the elastic member 360 does not contact the one surface 310A of the support member 310, thus forming a space therebetween. The guide pad 330 is disposed without being spaced apart from the one surface 310A of the support member 310, whereas the elastic member 360 may be formed at a location spaced apart from the one surface 310A of the support member 310 in the positive z-axis direction.

According to various embodiments, in case that the elastic member 360 receives a force from the outside through a user input of the key 300, a pressing member 362 included in the elastic member 360 may move in a direction (e.g., the negative z-axis direction) toward the switch member 320 and come into contact with the switch member 320. Contacting the switch member 320, the pressing member 362 may transmit a force generated by the user input to the switch member 320.

According to various embodiments, the adhesive member 340 may be combined with the one surface of the guide pad 330. For example, the adhesive member 340 may be disposed in the positive z-axis direction of the guide pad 330 and bonded to the guide pad 330.

The adhesive member 340 according to various embodiments of the disclosure may include a material having an adhesive property. The adhesive member 340 may be in contact with the key cap 350 and the guide pad 330 in at least a portion of the adhesive member 340.

In various embodiments, one surface of the adhesive member 340 may refer to an upper surface (a surface facing in the positive z-axis direction) of the adhesive member 340, and the other surface of the adhesive member 340 may refer to a lower surface (a surface facing in the negative z-axis direction) of the adhesive member 340. The adhesive member 340 may be in contact with the key cap 350 on the one surface of the adhesive member 340 (e.g., the upper surface of the adhesive member 340). The adhesive member 340 may be in contact with the guide pad 330 on the other surface of the adhesive member 340 (e.g., the lower surface of the adhesive member 340).

According to various embodiments, the key cap 350 may be disposed on the one surface of the elastic member 360 and the one surface of the adhesive member 340. For example, the key cap 350 may be disposed in the positive z-axis direction with respect to the elastic member 360 and the adhesive member 340. The key cap 350 may have a rectangular shaped cross-section with respect to the x-y plane.

The key cap 350 according to various embodiments of the disclosure may include a peripheral region 351 and a button region 352. The peripheral region 351 of the key cap 350 forms the perimeter of the key cap 350 and adjoins to the perimeter of the button region 352. The peripheral region 351 may be combined with the adhesive member 340 in at least a portion of the peripheral region 351. For example, with reference to FIG. 3, the peripheral region 351 of the key cap 350 may be bonded to the adhesive member 340 positioned in the negative z-axis direction with respect to the peripheral region 351.

According to various embodiments, the button region 352 of the key cap 350 may be a region protruding in the positive z-axis direction compared to the peripheral region 351 of the key cap 350. The button region 352 may be formed to have a thickness in the positive z-axis direction with respect to the z-axis position of the peripheral region 351. The button region 352 may be a region to which a force is applied by the user when the user uses the key 300.

The key cap 350 according to various embodiments of the disclosure may include various materials. For example, the key cap 350 may be made of a urethane material or a resin material. The resin material may be a material having greater rigidity than that of the urethane material.

Including the elastic member 360, the key 300 according to various embodiments of the disclosure can provide an elastic force. For example, in case that the key cap 350 of the key 300 is made of a urethane material, the restoration of the key cap 350 may occur slowly after a user's force is applied to the key cap 350. The key 300 including the elastic member 360 according to various embodiments of the disclosure can provide an elastic force so that the key cap 350 made of a urethane material can be quickly restored. Even in case that the key cap 350 of the key 300 is made of a resin material, the key 300 including the elastic member 360 according to various embodiments of the disclosure can allow the user of the key 300 to perceive an elastic material through tactile sense.

Figure 4:
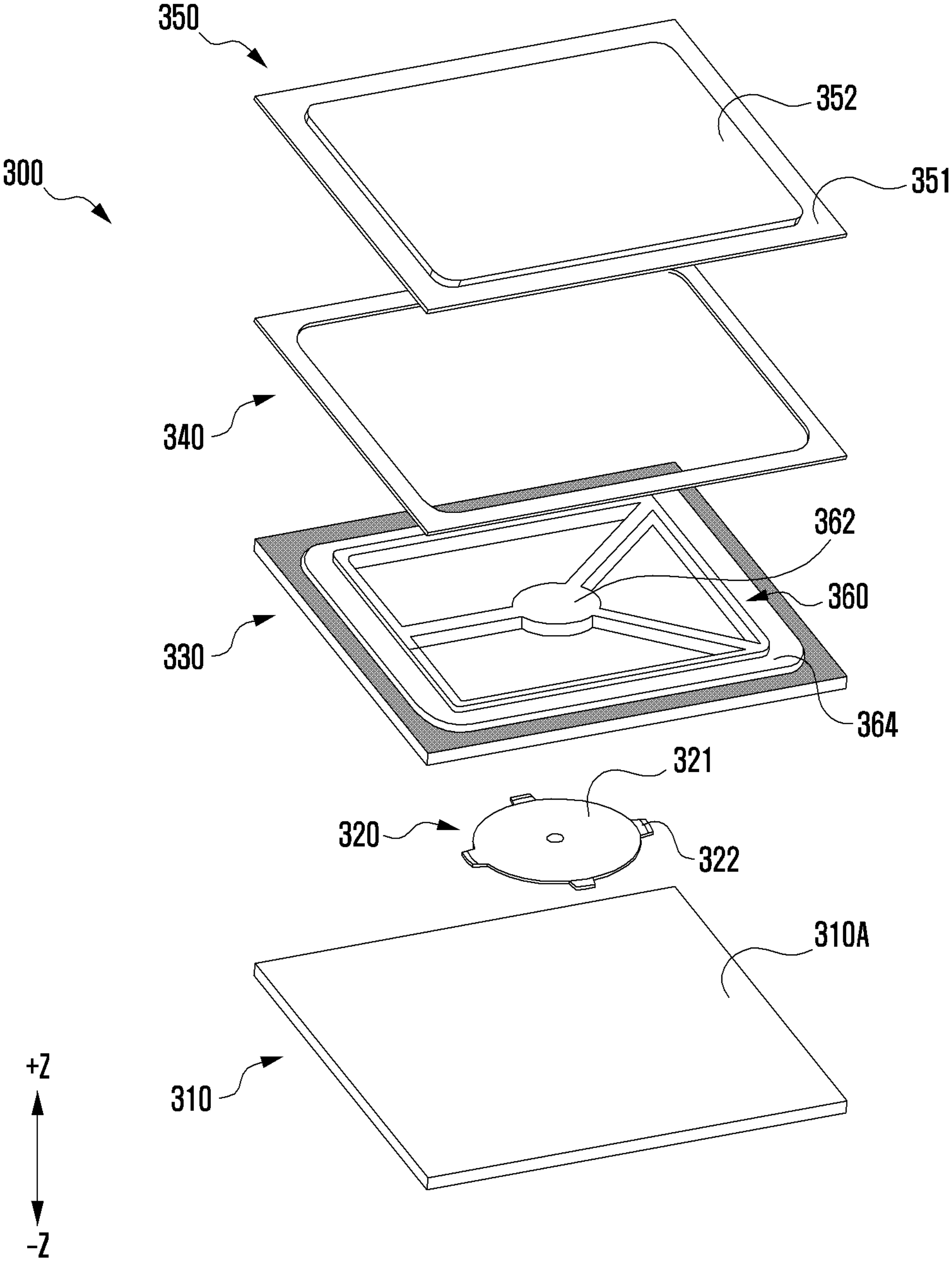
FIG. 4 is an exploded perspective view illustrating a key according to an embodiment of the disclosure.

FIG. 4 is an exploded perspective view illustrating a key 300 according to an embodiment of the disclosure.

Each of the plurality of keys 300 according to various embodiments of the disclosure may include the support member 310, the switch member 320, the guide pad 330, the adhesive member 340, the key cap 350, and/or the elastic member 360.

According to various embodiments, the switch member 320 may be positioned in the positive z-axis direction with respect to the support member 310. For example, the one surface 310A of the support member 310 may have the central region 315 (see FIG. 3), and the switch member 320 may be disposed in the positive z-axis direction with respect to the central region 315 (see FIG. 3) at a position that may overlap with the central region 315 (see FIG. 3) of the support member 310.

The switch member 320 according to various embodiments of the disclosure may include a load region 321 and a connection region 322. The load region 321 of the switch member 320 may receive a force from the elastic member 360 and transmit the force to the support member 310. In case that no force is applied to the key 300, the load region 321 may be spaced apart from the one surface 310A of the support member 310. Referring to FIG. 4, the load region 321 may be formed to have a circular horizontal cross-section, but the shape of the load region 321 may not be limited thereto.

The connection region 322 of the switch member 320 according to various embodiments of the disclosure may refer to a region where the switch member 320 and the support member 310 are connected. The switch member 320 forms the connection region 322 at least in part and may be connected to the support member 310 through the connection region 322. The connection region 322 may be formed to protrude from the load region 321 of the switch member 320, and one end of the connection region 322 may be connected to the support member 310. For example, with reference to FIG. 4, the switch member 320 may include four connection regions 322 formed in a shape protruding from the load region 321 of the switch member 320, and the four connection regions 322 may be connected to support member 310.

According to various embodiments, the elastic member 360 may be positioned in the positive z-axis direction with respect to the switch member 320. For example, the pressing member 362 included in the elastic member 360 may be located in the positive z-axis direction with respect to the switch member 320.

According to various embodiments, the pressing member 362 may be formed at a position that may overlap with the switch member 320. For example, the pressing member 362 is formed at a position that may overlap with the switch member 320, and in case that a force is applied to the pressing member 362, it may move in the negative z-axis direction and come into contact with the switch member 320.

Referring to FIG. 4, the pressing member 362 and the switch member 320 have a circular horizontal cross-section, but they are not limited to the above and may have any other horizontal cross-section of various shapes.

According to various embodiments, the pressing member 362 may be formed to have a smaller horizontal cross-section than the switch member 320. For example, in case that the pressing member 362 and the switch member 320 are formed to have a circular horizontal cross-section, the diameter of the pressing member 362 may be smaller than the diameter of the switch member 320.

According to various embodiments, the guide pad 330 may be formed to surround the perimeter of the elastic member 360. For example, the guide pad 330 may be formed to adjoin to the periphery of a guide region 364 (see FIG. 5) included in the elastic member 360.

According to various embodiments, the adhesive member 340 may be positioned in the positive z-axis direction with respect to the guide pad 330. For example, the adhesive member 340 may be disposed on one surface (a surface facing in the positive z-axis direction) of the guide pad 330 and combined with the guide pad 330 by adhesion.

The key cap 350 may be positioned in the positive z-axis direction with respect to the adhesive member 340. The key cap 350 may be disposed on one surface (a surface facing in the positive z-axis direction) of the adhesive member 340 and combined with the adhesive member 340 by adhesion.

The key cap 350 according to various embodiments of the disclosure may include the peripheral region 351 and the button region 352. The peripheral region 351 of the key cap 350 forms the perimeter of the key cap 350 and may be combined with the adhesive member 340 at least in part.

According to various embodiments, the button region 352 of the key cap 350 may be a region protruding in the positive z-axis direction compared to the peripheral region 351 of the key cap 350. The button region 352 may be formed to have a thickness in the positive z-axis direction with respect to the peripheral region 351. The button region 352 may be a region to which a force is applied by the user when the user uses the key 300. The button region 352 of the key cap 350 is made of an elastic material that allows deformation in a direction of a force, which may transmit the force to the elastic member 360. The button region 352 may be formed at a position having the largest z-axis coordinate value in the key 300, based on the positive z-axis direction.

In case that the user uses the key 300 according to various embodiments of the disclosure, the user may apply a force to the button region 352 of the key cap 350. The button region 352 of the key cap 350 may transmit the force to the elastic member 360 positioned in the negative z-axis direction with respect to the button region 352. The elastic member 360 may transmit the force to the switch member 320 located in the negative z-axis direction of the pressing member 362 through the pressing member 362 included in the elastic member 360. The load region 321 of the switch member 320 may be deformed in the negative z-axis direction and thereby transmit the force to the support member 310. The support member 310 may be electrically connected to the switch member 320 through the conductive contact member (not shown) included in the support member 310 and thereby recognize an input signal.

After the support member 310 according to various embodiments of the disclosure recognizes an input signal by the user, the load region 321 deformed in the negative z-axis direction may be restored to a state before the force is transmitted. While being restored to the previous state, the load region 321 may be deformed in the positive z-axis direction, come into contact with the elastic member 360, and thereby transmit a force to the elastic member 360. The elastic member 360 may transmit the received force to the key cap 350 located in the positive z-axis direction of the elastic member 360.

Figure 5:
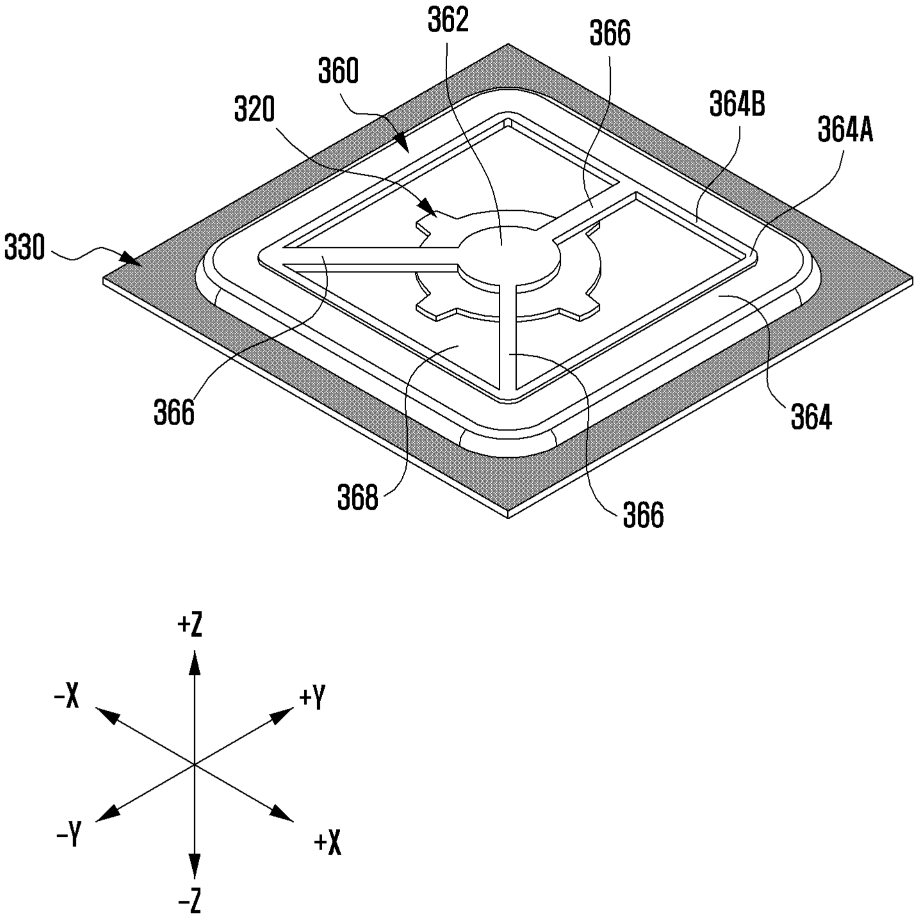
FIG. 5 is a diagram illustrating an elastic member including three elastic bridges according to an embodiment of the disclosure.

FIG. 5 is a diagram illustrating an elastic member 360 including three elastic bridges 366 according to an embodiment of the disclosure.

The guide pad 330 according to an embodiment of the disclosure may be disposed outside the perimeter of the elastic member 360. The perimeter of the guide pad 330 may be formed in a rectangular shape. For example, with reference to FIG. 5, the guide pad 330 may form a rectangle having a side parallel to the x-axis direction and a side parallel to the y-axis direction on the x-y plane along the perimeter of the guide pad 330.

In the elastic member 360 according to various embodiments of the disclosure, a direction parallel to the x-axis may refer to a longitudinal direction of the elastic member 360, and a direction parallel to the y-axis may refer to a width direction of the elastic member 360.

The elastic member 360 according to an embodiment of the disclosure may include the pressing member 362, the guide region 364, the elastic bridges 366, and/or a flow opening 368.

According to various embodiments, the pressing member 362 may be formed in a shape having a circular cross-section. For example, with reference to FIG. 5, the horizontal cross-section of the pressing member 362 based on the x-y plane may have a circular shape.

The pressing member 362 according to an embodiment of the disclosure is formed at a position that may overlap with the switch member 320, and may transmit a force applied to the pressing member 362 to the switch member 320.

The elastic member 360 according to various embodiments of the disclosure may include the guide region 364. The guide region 364 is formed in the perimeter of the elastic member 360 and may adjoin to the guide pad 330. The guide region 364 may have two surfaces parallel to the longitudinal direction of the elastic member 360 and two surfaces parallel to the width direction of the elastic member 360.

In various embodiments of the disclosure, the guide region 364 may have four corner portions 364A. The corner portion 364A may refer to an area where a surface in the longitudinal direction and a surface in the width direction meet in the guide region 364. The four corner portions 364A may be formed at the same distance from the pressing member 362.

The elastic member 360 according to an embodiment of the disclosure may include three elastic bridges 366. Each of the three elastic bridges 366 may connect at least a portion of the guide region 364 and the pressing member 362.

Referring to FIG. 5, one elastic bridge 366 according to an embodiment of the disclosure may extend from the pressing member 362 and be vertically connected to one surface 364B of the guide region 364. For example, with reference to FIG. 5, the one elastic bridge 366 may extend parallel to the width direction (the y-axis direction) of the elastic member 360 from the pressing member 362 and be vertically connected to the one surface 364B (e.g., a surface formed parallel to the x-axis direction) of the guide region 364.

Referring to FIG. 5, two elastic bridges 366 according to an embodiment of the disclosure may connect the corner portions 364A formed in the guide region 364 and the pressing member 362. For example, each of the two elastic bridges 366 may be formed to extend from the pressing member 362 to the corner portion 364A of the guide region 364.

The two elastic bridges 366 according to an embodiment of the disclosure may be connected to the guide region 364 in the same direction from the pressing member 362. For example, with reference to FIG. 5, the two elastic bridges 366 may be connected to the guide region 364 located in the negative y-axis direction with respect to the pressing member 362.

The two elastic bridges 366 according to an embodiment of the disclosure may extend from the pressing member 362 to the guide region 364 in a direction opposite to the extending direction of the remaining one elastic bridge 366 and then be connected to the corner portions 364A. For example, with reference to FIG. 5, the one elastic bridge 366 may be vertically connected to the one surface 364B of the guide region 364 in the positive y-axis direction from the pressing member 362, and the remaining two elastic bridges 366 may be connected to the corner portions 364A of the guide region 364 in the negative y-axis direction from the pressing member 362.

In case that a force is applied to the elastic member 360 according to an embodiment of the disclosure, the displacement of the elastic member 360 in the z-axis direction may be greatest in the pressing member 362 included in the elastic member 360. The pressing member 362 may form a displacement in a direction (the negative z-axis direction) toward the switch member 320 and thereby transmit the force received from the user to the switch member 320.

The elastic member 360 according to an embodiment of the disclosure may include the flow opening 368. The flow opening 368 may refer to an opening formed between the elastic bridge 366 and the guide region 364 in the elastic member 360. Referring to FIG. 5, two elastic bridges 366 and the guide region 364 may form one flow opening 368.

Referring to FIG. 5, the elastic member 360 according to an embodiment of the disclosure may have three flow openings 368. For example, with reference to FIG. 5, the flow openings 368 may be formed in each of the negative y-axis direction, the positive x-axis direction, and the negative x-axis direction with respect to the pressing member 362.

In the elastic member 360 according to an embodiment of the disclosure, as the area occupied by the flow openings 368 in the elastic member 360 decreases, the area in which the elastic member 360 can receive a force may increase. The strength of the elastic member 360 may increase as the area in which the elastic member 360 can receive a force increases. Because the resistance transmitted to the user of the key 300 increases as the strength of the elastic member 360 increases, the resistance transmitted to the user may increase as the area occupied by the flow openings 368 in the elastic member 360 decreases.

The strength of the elastic member 360 according to an embodiment of the disclosure may increase as the area in which the elastic member 360 can receive a force increases. The resistance of the elastic member 360 to an external force may increase as the strength of the elastic member 360 increases. The displacement of the elastic member 360 may be formed to be relatively small as the resistance of the elastic member 360 to an external force increases. As the area of the elastic member 360 increases, the elastic member 360 may have a stronger resistance to an external force and a smaller displacement.

Figure 6:
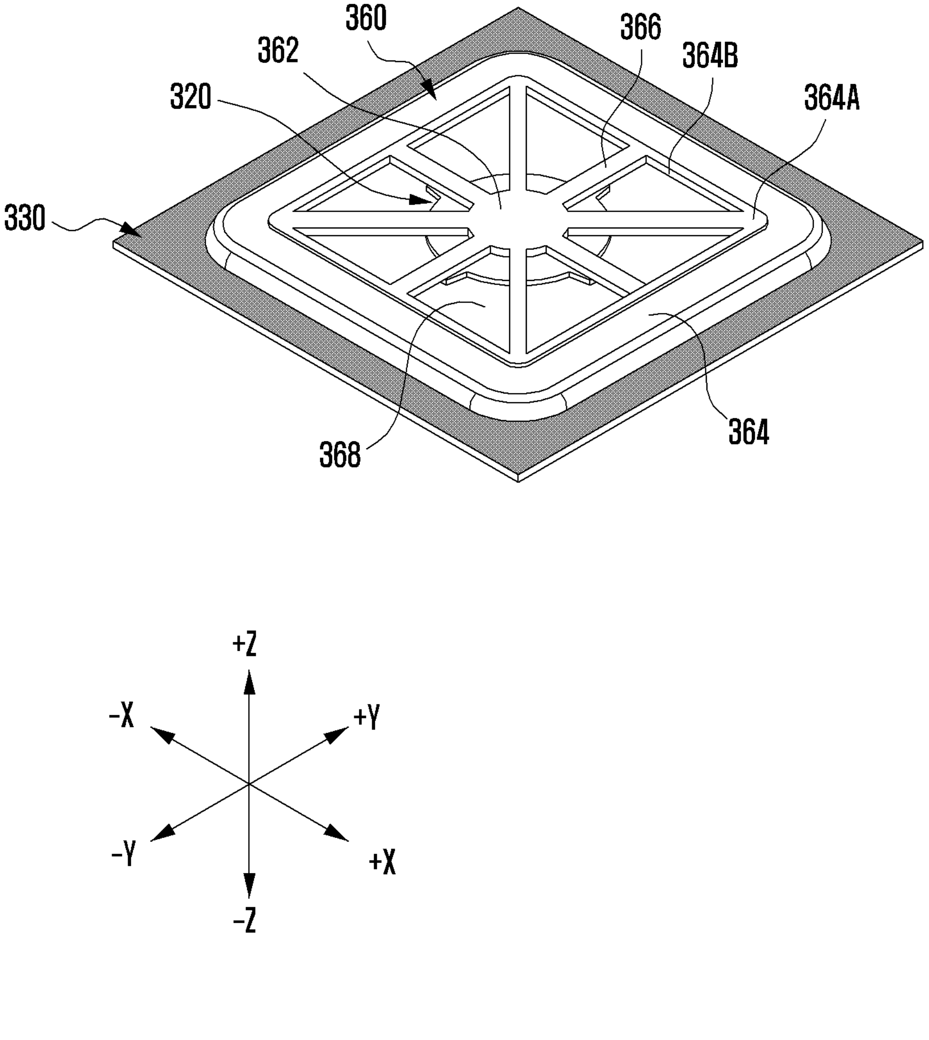
FIG. 6 is a diagram illustrating an elastic member including eight elastic bridges according to an embodiment of the disclosure.

FIG. 6 is a diagram illustrating an elastic member 360 including eight elastic bridges 366 according to an embodiment of the disclosure.

The guide pad 330 according to an embodiment of the disclosure may be disposed outside the perimeter of the elastic member 360. The perimeter of the guide pad 330 may be formed in a rectangular shape. For example, with reference to FIG. 6, the guide pad 330 may form a rectangle having a side parallel to the x-axis direction and a side parallel to the y-axis direction on the x-y plane along the perimeter of the guide pad 330.

In the elastic member 360 according to various embodiments of the disclosure, a direction parallel to the x-axis may refer to a longitudinal direction of the elastic member 360, and a direction parallel to the y-axis may refer to a width direction of the elastic member 360.

The elastic member 360 according to an embodiment of the disclosure may include the pressing member 362, the guide region 364, the elastic bridges 366, and/or a flow opening 368.

The pressing member 362 according to an embodiment of the disclosure is formed at a position that may overlap with the switch member 320, and may transmit a force applied to the pressing member 362 to the switch member 320.

The elastic member 360 according to various embodiments of the disclosure may include the guide region 364. The guide region 364 is formed in the perimeter of the elastic member 360 and may adjoin to the guide pad 330. The guide region 364 may have two surfaces parallel to the longitudinal direction of the elastic member 360 and two surfaces parallel to the width direction of the elastic member 360.

In various embodiments of the disclosure, the guide region 364 may have four corner portions 364A. The corner portion 364A may refer to an area where a surface in the longitudinal direction and a surface in the width direction meet in the guide region 364. The four corner portions 364A may be formed at the same distance from the pressing member 362.

The elastic member 360 according to an embodiment of the disclosure may include eight elastic bridges 366. Each of the eight elastic bridges 366 may connect at least a portion of the guide region 364 and the pressing member 362.

Four elastic bridges 366 according to an embodiment of the disclosure may extend in the longitudinal direction or the width direction of the elastic member 360 from the pressing member 362 and be connected to the guide region 364. For example, with reference to FIG. 6, two elastic bridges 366 may extend parallel to the longitudinal direction (e.g., the x-axis direction) of the elastic member 360 from the pressing member 362 and be vertically connected to the guide region 364. Other two elastic bridges 366 may extend parallel to the width direction (e.g., the y-axis direction) of the elastic member 360 from the pressing member 362 and be vertically connected to the guide region 364.

Other four elastic bridges 366 according to an embodiment of the disclosure may be formed to connect the pressing member 362 to four corner portions 364A formed in the guide region 364. For example, with reference to FIG. 6, each of these four elastic bridges 366 may be connected from the pressing member 362 to the corner portion 364A of the guide region 364.

In case that a force is applied to the elastic member 360 according to an embodiment of the disclosure from the outside, the displacement of the elastic member 360 in the z-axis direction may be greatest in the pressing member 362 included in the elastic member 360. The pressing member 362 may form a displacement in a direction (the negative z-axis direction) toward the switch member 320 and thereby transmit the force received through a user input of the key 300 to the switch member 320.

The elastic member 360 according to an embodiment of the disclosure may include the flow opening 368. The flow opening 368 may refer to an opening formed between the elastic bridge 366 and the guide region 364 in the elastic member 360. Referring to FIG. 6, two elastic bridges 366 and the guide region 364 may form one flow opening 368.

Referring to FIG. 6, the elastic member 360 according to an embodiment of the disclosure may have eight flow openings 368. For example, with reference to FIG. 6, the elastic member 360 may include four flow openings 368 in the positive x-axis direction with respect to the pressing member 362 and other four flow openings 368 in the negative x-axis direction with respect to the pressing member 362.

In the elastic member 360 according to an embodiment of the disclosure, as the area occupied by the flow openings 368 in the elastic member 360 decreases, the area in which the elastic member 360 can receive a force may increase. The strength of the elastic member 360 may increase as the area in which the elastic member 360 can receive a force increases. Because the resistance transmitted to the user of the key 300 increases as the strength of the elastic member 360 increases, the resistance transmitted to the user may increase as the area occupied by the flow openings 368 decreases.

Figure 7:
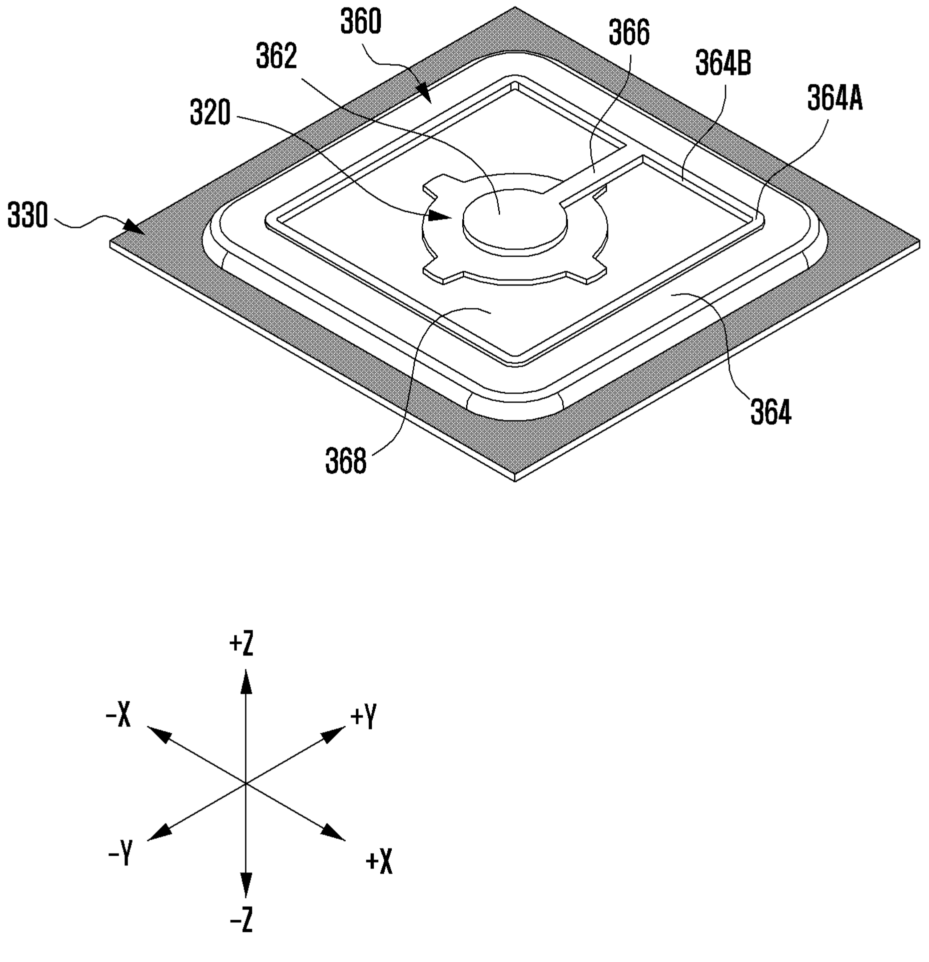
FIG. 7 is a diagram illustrating an elastic member including one elastic bridge according to an embodiment of the disclosure.

FIG. 7 is a diagram illustrating an elastic member 360 including one elastic bridge 366 according to an embodiment of the disclosure.

The guide pad 330 according to an embodiment of the disclosure may be disposed outside the perimeter of the elastic member 360. The perimeter of the guide pad 330 may be formed in a rectangular shape. For example, with reference to FIG. 7, the guide pad 330 may form a rectangle having a side parallel to the x-axis direction and a side parallel to the y-axis direction on the x-y plane along the perimeter of the guide pad 330.

In the elastic member 360 according to various embodiments of the disclosure, a direction parallel to the x-axis may refer to a longitudinal direction of the elastic member 360, and a direction parallel to the y-axis may refer to a width direction of the elastic member 360.

The elastic member 360 according to an embodiment of the disclosure may include the pressing member 362, the guide region 364, the elastic bridges 366, and/or a flow opening 368.

The pressing member 362 according to an embodiment of the disclosure is formed at a position that may overlap with the switch member 320, and may transmit a force applied to the pressing member 362 to the switch member 320.

The elastic member 360 according to various embodiments of the disclosure may include the guide region 364. The guide region 364 is formed in the perimeter of the elastic member 360 and may adjoin to the guide pad 330. The guide region 364 may have two surfaces parallel to the longitudinal direction of the elastic member 360 and two surfaces parallel to the width direction of the elastic member 360.

In various embodiments of the disclosure, the guide region 364 may have four corner portions 364A. The corner portion 364A may refer to an area where a surface in the longitudinal direction and a surface in the width direction meet in the guide region 364. The four corner portions 364A may be formed at the same distance from the pressing member 362.

The elastic member 360 according to an embodiment of the disclosure may include one elastic bridge 366. The one elastic bridge 366 may connect at least a portion of the guide region 364 and the pressing member 362.

Referring to FIG. 7, the one elastic bridge 366 according to an embodiment of the disclosure may be formed to extend perpendicularly to the one surface 364B of the guide region 364 from the pressing member 362. For example, the elastic bridge 366 may extend parallel to the width direction (the y-axis direction) of the elastic member 360 from the pressing member 362 and be vertically connected to the one surface 364B (e.g., a surface formed parallel to the x-axis direction) of the guide region 364. In some embodiments, the elastic bridge 366 may extend parallel to the longitudinal direction (the x-axis direction) of the elastic member 360 from the pressing member 362 and be vertically connected to the guide region 364.

In case that a force is applied to the elastic member 360 according to an embodiment of the disclosure, the displacement of the elastic member 360 in the z-axis direction may be greatest in the pressing member 362 included in the elastic member 360. The pressing member 362 may form a displacement in a direction (the negative z-axis direction) toward the switch member 320 and thereby transmit the force received through a user input of the key 300 to the switch member 320.

The elastic member 360 according to an embodiment of the disclosure may include the flow opening 368. The flow opening 368 may refer to an opening formed between the elastic bridge 366 and the guide region 364 in the elastic member 360. Referring to FIG. 7, the one elastic bridges 366 and the guide region 364 may form one flow opening 368.

In the elastic member 360 according to an embodiment of the disclosure, as the area occupied by the flow openings 368 in the elastic member 360 decreases, the area in which the elastic member 360 can receive a force may increase. The strength of the elastic member 360 may increase as the area in which the elastic member 360 can receive a force increases. Because the resistance transmitted to the user of the key 300 increases as the strength of the elastic member 360 increases, the resistance transmitted to the user may increase as the area occupied by the flow openings 368 decreases.

Figure 8A:
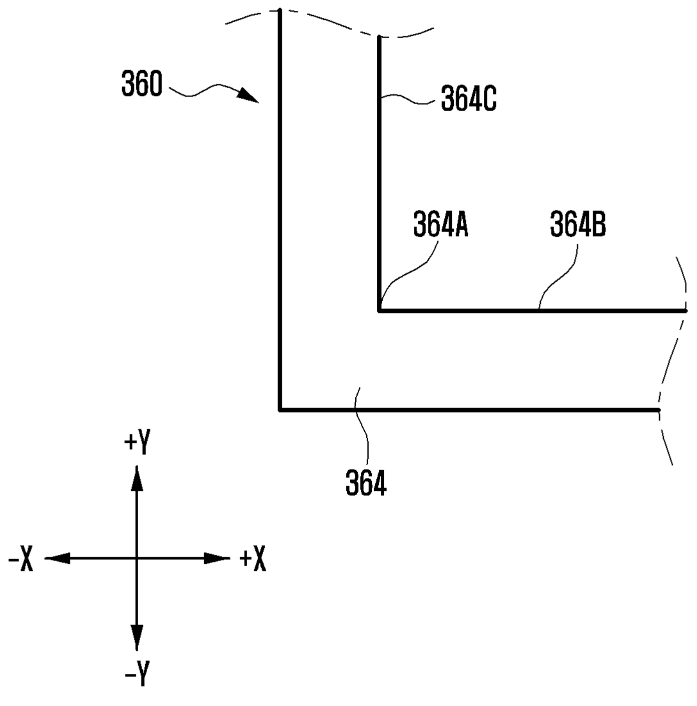
FIGS. 8A and 8B are diagrams illustrating a corner portion of an elastic member according to various embodiments of the disclosure.

FIG. 8A is a diagram illustrating a corner portion 364A vertically connecting a surface 364B in the longitudinal direction and a surface 364C in the width direction in the elastic member 360 according to an embodiment of the disclosure.

Figure 8B:
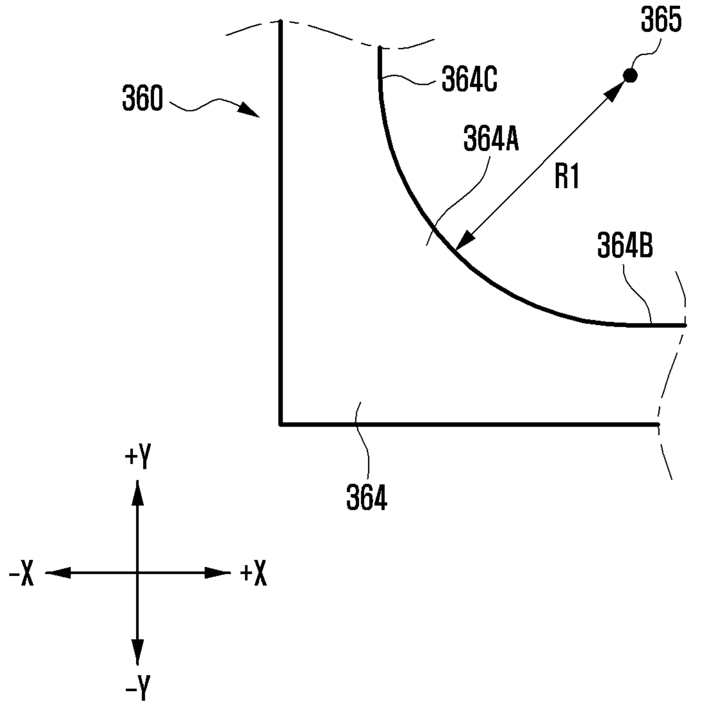

FIG. 8B is a diagram illustrating a corner portion 364A including a curve having a radius of curvature R1 according to an embodiment of the disclosure.

In the elastic member 360 according to various embodiments of the disclosure, a direction parallel to the x-axis may refer to a longitudinal direction of the elastic member 360, and a direction parallel to the y-axis may refer to a width direction of the elastic member 360.

Referring to FIG. 8A, the guide region 364 according to an embodiment of the disclosure may have the longitudinal direction surface 364B parallel to the longitudinal direction of the elastic member 360 and the width direction surface 364C parallel to the width direction of the elastic member 360. The longitudinal direction surface 364B and the width direction surface 364C of the guide region 364 may be connected through the corner portion 364A. For example, with reference to FIG. 8A, the corner portion 364A according to an embodiment of the disclosure may vertically connect the longitudinal direction surface 364B and the width direction surface 364C of the guide region 364.

Referring to FIG. 8B, the guide region 364 according to an embodiment of the disclosure may include the corner portion 364A including a curve having a radius of curvature R1. The guide region 364 according to an embodiment of the disclosure may have the longitudinal direction surface 364B parallel to the longitudinal direction of the elastic member 360 and the width direction surface 364C parallel to the width direction of the elastic member 360. The longitudinal direction surface 364B and the width direction surface 364C of the guide region 364 may be connected through the corner portion 364A. For example, with reference to FIG. 8B, the longitudinal direction surface 364B and the width direction surface 364C of the guide region 364 according to an embodiment of the disclosure may be connected in the form of a curve having a radius of curvature R1 in the corner portion 364A.

The corner portion 364A according to an embodiment of the disclosure may include a curve having a distance from the center of curvature 365 by the radius of curvature R1. The position of the center of curvature 365 is not fixed and may be moved according to the length of the radius of curvature R1 formed by the corner portion 364A. For example, as the radius of curvature R1 formed by the corner portion 364A increases in length, the position of the center of curvature 365 may move away from the corner portion 364A. As the radius of curvature R1 formed by the corner portion 364A increases in length, the area of the corner portion 364A may increase. For example, if the radius of curvature R1 formed by the corner portion 364A increases in length, the position of the center of curvature 365 may move away from the corner portion 364A, and the area of the corner portion 346A may increase. As the area of the corner portion 364A increases, the elastic member 360 may have a larger area.

According to various embodiments, the strength of the elastic member 360 may vary depending on the shape of the corner portion 364A included in the elastic member 360. In case that the area capable of supporting a force applied to the elastic member 360 is increased due to an increase in the area of the corner portion 364A, the strength of the elastic member 360 may be increased.

For example, the corner portion 364A of FIG. 8B connects the longitudinal direction surface 364B and the width direction surface 364C of the guide region 364 in the form of the curve having the radius of curvature R1, so that it can form a larger area compared to the vertically connected corner portion 364A of FIG. 8A. Accordingly, the elastic member 360 including the curved corner portion 364A of FIG. 8B has a larger area than the elastic member 360 including the vertical corner portion 364A of FIG. 8A, thus having great strength.

Figure 9A:
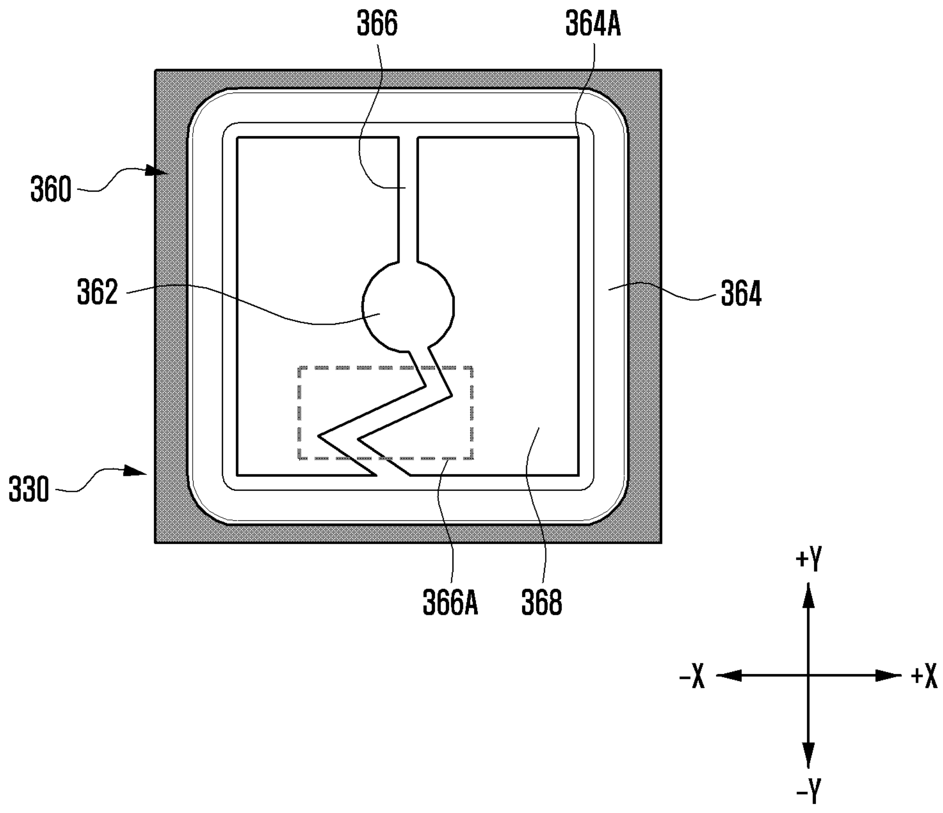
FIGS. 9A and 9B are diagrams illustrating an elastic member including an elastic bridge with a bent portion or a concave portion according to various embodiments of the disclosure.

FIG. 9A is a diagram illustrating an elastic member 360 including an elastic bridge 366 with a bent portion 366A according to an embodiment of the disclosure.

Figure 9B:
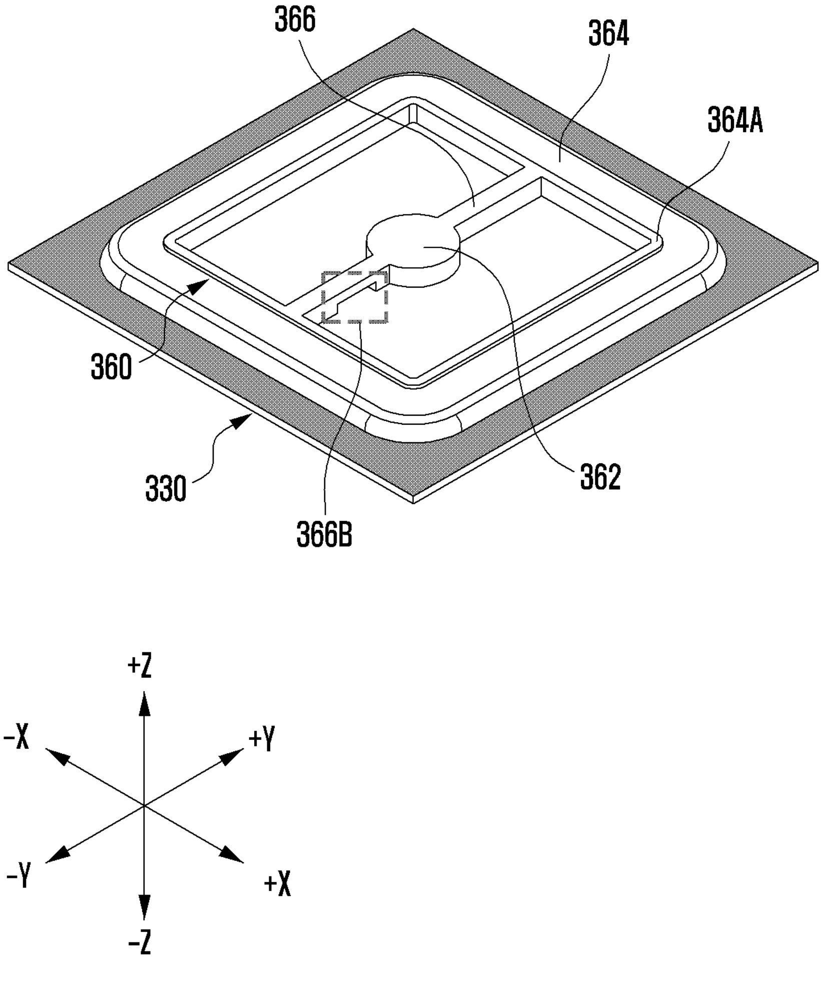

FIG. 9B is a diagram illustrating an elastic member 360 including an elastic bridge 366 with a concave portion 366B according to an embodiment of the disclosure.

Referring to FIGS. 5, 6, and 7, the elastic bridge 366 according to various embodiments of the disclosure may extend from the pressing member 362 toward the guide region 364 in a straight line.

Referring to FIG. 9A, the elastic member 360 according to an embodiment of the disclosure may include the elastic bridge 366 in which a bent portion 366A is formed at least in part. The elastic bridge 366 is not limited to a straight shape and may extend from the pressing member 362 toward the guide region 364 in various shapes. The elastic bridge 366 extends from the pressing member 362 to the guide region 364 and may include the bent portion 366A in at least a part of the elastic member 366. The bent portion 366A may refer to a region where the elastic bridge 366 is bent in a direction perpendicular to the extending direction. For example, with reference to FIG. 9A, the elastic bridge 366 located in the negative y-axis direction with respect to the pressing member 362 has the bent portion 366A at least in part and is connected from the pressing member 362 to the guide region 364.

Referring to FIG. 9A, the elastic bridge 366 may be bent at the bent portion 366A in a direction perpendicular to the direction from the pressing member 362 toward the guide region 364. For example, the elastic bridge 366 is formed to extend from the pressing member 362 toward the guide region 364 located in the negative y-axis direction of the pressing member 362, and it may be bent at the bent portion 366A in the negative x-axis direction or the positive x-axis direction.

According to various embodiments, the local strength of the elastic member 360 may vary depending on an area formed by a specific region of the elastic member 360. In case that the area of the specific region included in the elastic member 360 increases, the local strength of the specific region may increase. For example, with reference to FIG. 9A, the elastic bridge 366 formed in the negative y-axis direction with respect to the pressing member 362 includes the bent portion 366A, so it may form a larger area compared to the elastic bridge 366 formed in the positive y-axis direction with respect to the pressing member 362 and extending in a straight line without including the bent portion 366A. Therefore, the elastic bridge 366 including the bent portion 366A may have a locally greater strength than the elastic bridge 366 without the bent portion 366A.

Referring to FIG. 9B, the elastic member 360 according to an embodiment of the disclosure may include the elastic bridge 366 in which the concave portion 366B is formed. The elastic bridge 366 may have the concave portion 366B at least in part. The concave portion 366B may refer to a region where a thickness (e.g., a thickness in the z-axis direction) is formed smaller than that of other portions of the elastic bridge 366. For example, with reference to FIG. 9B, the elastic bridge 366 located in the negative y-axis direction with respect to the pressing member 362 includes the concave portion 366B, and the thickness of the elastic bridge 366 in the concave portion 366B is formed to be smaller than the thickness of other portions of the elastic bridge 366.

According to various embodiments, the local strength of the elastic member 360 may vary depending on an area formed by a specific region of the elastic member 360. In case that the area of the specific region included in the elastic member 360 increases, the local strength of the specific region may increase. Referring to FIG. 9B, the elastic bridge 366 formed in the negative y-axis direction with respect to the pressing member 362 includes the concave portion 366B, so it may form a smaller thickness (e.g., a thickness in the z-axis direction) and area compared to the elastic bridge 366 that does not include the concave portion 366B. Therefore, the elastic bridge 366 including the concave portion 366B may have a locally small strength than the elastic bridge 366 without the concave portion 366B.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. The electronic devices according to embodiments of the disclosure are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., module or program) of the above-described components may include a singular or a plurality of entities, and some of the plurality of entities may be separately disposed in any other component. According to various embodiments, one or more components or operations among the above-described components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing having a first surface, a second surface formed parallel to the first surface, and a side surface surrounding a space formed between the first surface and the second surface; and a key input device disposed on the first surface and including a plurality of keys, wherein each of the plurality of keys comprises:

a support member including a conductive contact member, a switch member disposed on one surface of the support member and configured to electrically connect to the conductive contact member of the support member, a key cap including a button region, and an elastic member having one surface on which the key cap is disposed, and other surface on which the switch member is disposed at least in part, wherein the elastic member comprises:

a pressing member capable of transmitting a force in contact with the switch member, and at least one elastic bridge connecting the pressing member and a guide region formed in a perimeter of the elastic member, and wherein an elastic bridge among the at least one elastic bridge includes a concave portion being a region where a thickness measured from a first surface of the elastic bridge facing the key cap to a second surface of the elastic bridge facing the opposite direction is smaller than a thickness of the other portion of the elastic bridge measured from the first surface of the elastic bridge to the second surface of the elastic bridge.

2. The electronic device of claim 1, wherein each of the plurality of keys further comprises:

a guide pad disposed outside a periphery of the elastic member; and an adhesive member in contact with the key cap on one surface thereof and in contact with the guide pad on other surface thereof.

3. The electronic device of claim 1, wherein the elastic member further comprises a flow opening formed between the elastic bridge and the guide region.

4. The electronic device of claim 1, wherein the elastic member includes only one elastic bridge as the elastic bridge.

5. The electronic device of claim 4, wherein the elastic bridge extends from the pressing member and is vertically connected to one surface of the guide region.

6. The electronic device of claim 1, wherein the elastic member includes a plurality of elastic bridges as the elastic bridge, and wherein the guide region of the elastic member has four corner portions where a longitudinal direction surface and a width direction surface of the guide region meet.

7. The electronic device of claim 6, wherein the elastic member includes three elastic bridges as the elastic bridge, wherein one elastic bridge of the three elastic bridges extends from the pressing member and is vertically connected to one surface of the guide region, and wherein remaining two elastic bridges of the three elastic bridges extend from the pressing member to the guide region formed in a direction opposite to an extending direction of the one elastic bridge and are connected to the corner portions.

8. The electronic device of claim 6, wherein the elastic member includes eight elastic bridges as the elastic bridge, wherein four elastic bridges of the eight elastic bridges extend in a longitudinal direction or a width direction of the elastic member from the pressing member and are connected to the guide region, and wherein remaining four elastic bridges of the eight elastic bridges connect the pressing member to the corner portions.

9. The electronic device of claim 6, wherein each of the corner portions includes a curve having a radius of curvature.

10. The electronic device of claim 1, wherein the elastic bridge includes a bent portion that is bent in a direction perpendicular to an extending direction of the elastic bridge in at least a part of the elastic bridge.

11. The electronic device of claim 1, wherein the concave portion is formed by a recess in the second surface of the elastic bridge.

12. A key input device including a plurality of keys, wherein each of the plurality of keys comprises:

a support member including a conductive contact member, a switch member disposed on one surface of the support member and configured to electrically connect to the conductive contact member of the support member, a key cap including a button region, and an elastic member having one surface on which the key cap is disposed, and another surface on which the switch member is disposed at least in part, wherein the elastic member comprises:

a pressing member capable of transmitting a force in contact with the switch member, and at least one elastic bridge connecting the pressing member and a guide region formed in a perimeter of the elastic member, and wherein an elastic bridge among the at least one elastic bridge includes a concave portion being a region where a thickness measured from a first surface of the elastic bridge facing the key cap to a second surface of the elastic bridge facing the opposite direction is smaller than a thickness of the other portion of the elastic bridge measured from the first surface of the elastic bridge to the second surface of the elastic bridge.

13. The key input device of claim 12, wherein each of the plurality of keys further comprises:

a guide pad disposed outside a periphery of the elastic member; and an adhesive member in contact with the key cap on one surface thereof and in contact with the guide pad on other surface thereof.

14. The key input device of claim 12, wherein the elastic member includes one elastic bridge as the elastic bridge, and wherein the elastic bridge extends perpendicular to one surface of the guide region from the pressing member.

15. The key input device of claim 12, wherein the elastic member includes a plurality of elastic bridges as the elastic bridge, and wherein the guide region of the elastic member has four corner portions where a longitudinal direction surface and a width direction surface of the guide region meet.

16. The key input device of claim 12, wherein the elastic bridge is disposed in substantially a straight line between the guide region and the pressing member.

17. The key input device of claim 12, wherein the elastic bridge comprises at least a first elastic bridge and a second elastic bridge, the first elastic bridge being disposed on a different side of the pressing member than the second elastic bridge, and wherein the first elastic bridge has a substantially even thickness and the second elastic bridge has a concave portion including a thinner portion than another portion of the second elastic bridge.

18. The key input device of claim 12, wherein the elastic member comprise material including at least one of acrylonitrile-butadiene-styrene (ABS) resin, polycarbonate (PC) resin, and polypropylene (PP) resin.

* * * * *